United States Patent
Ringe et al.

(10) Patent No.: US 10,725,958 B1
(45) Date of Patent: Jul. 28, 2020

(54) SYSTEM, METHOD AND APPARATUS FOR ENABLING PARTIAL DATA TRANSFERS WITH INDICATORS

(71) Applicant: Arm Limited, Cambridge (GB)

(72) Inventors: Tushar P. Ringe, Austin, TX (US);
Jamshed Jalal, Austin, TX (US);
Anitha Kona, Austin, TX (US); Mark David Werkheiser, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/271,015

(22) Filed: Feb. 8, 2019

(51) Int. Cl.
*G06F 13/00* (2006.01)
*G06F 13/42* (2006.01)
*G06F 13/20* (2006.01)

(52) U.S. Cl.
CPC .......... *G06F 13/4282* (2013.01); *G06F 13/20* (2013.01); *G06F 2213/0002* (2013.01)

(58) Field of Classification Search
CPC .............................. G06F 13/4282; G06F 13/20
USPC ........................................................... 710/31
See application file for complete search history.

(56) References Cited

U.S. PATENT DOCUMENTS

| | | | |
|---|---|---|---|
| 6,366,973 B1 | 4/2002 | Lo et al. | |
| 2012/0079203 A1* | 3/2012 | Balasubramanian | H03K 19/0016 711/122 |
| 2012/0144079 A1* | 6/2012 | Sakaguchi | G06F 13/4059 710/110 |
| 2014/0143471 A1 | 5/2014 | Moyer et al. | |
| 2015/0278113 A1* | 10/2015 | Mori | G06F 13/28 710/308 |

* cited by examiner

*Primary Examiner* — Chun Kuan Lee
(74) *Attorney, Agent, or Firm* — Leveque IP Law, P.C.

(57) ABSTRACT

A system, apparatus and method for an interface based system that may be composed of a diverse set of blocks with different data bus sizes. These different data bus sizes can be optimized by permitting partial data transfers on the different sized buses.

17 Claims, 5 Drawing Sheets

| New Fields 502 | Which Channel 504 | Who Drives it 506 | Width 508 | Meaning 510 |
|---|---|---|---|---|
| ChunkValidEnable 514 (512) | AR 516 | AXI Master 518 | 1 | AXI Master Telling AXI Slave Whether it Can Accept Partial Data Transfers (520) |
| CV[N-1:0] 524 (522) | R 526 | AXI Slave 528 | N | AXI Slave Telling AXI Master Which Chunk(s) are Valid on the Bus (530) |

FIG. 5

| New Fields 602 | Which Channel 604 | Who Drives it 606 | Width 608 | Meaning 610 |
|---|---|---|---|---|
| ChunkValidEnable 614 (612) | AR 616 | AXI Master 618 | 1 | AXI Master Telling AXI Slave Whether it Can Accept Partial Data Transfers (620) |
| MDTEnable 623 (621) | AR 625 | AXI Master 627 | 1 | AXI Master Telling AXI Slave Wheter it Can Accept Multiple Data Beats with Different RID's (629) |
| CV[N-1:0] 624 (622) | R 626 | AXI Slave 628 | N | AXI Slave Telling AXI Master Which Chunk(s) are Valid on the Bus (630) |
| RID[N-1:0] 644 (642) | R 646 | AXI Slave 648 | N*M (M=RID Width) | Various RID's Being Transferred Over the Bus. RID Value in the Field is Valid Based on CV[N-1:0] (650) |
| RRESP[N-1:0] 654 (652) | R 656 | AXI Slave 658 | N*M (M=RRESP Width) | Various RRESP's Being Transferred Over the Bus. RRESP Value in the Field is Valid Based on CV[N-1:0] (660) |
| RUSER[N-1:0] 664 (662) | R 666 | AXI Slave 668 | N*M (M=RUSER Width) | Various RUSER's Being Transferred Over the Bus. RUSER Value in the Field is Valid Based on CV[N-1:0] (670) |
| RLAST[N-1:0] 674 (672) | R 676 | AXI Slave 678 | N | Various RLAST's Being Transferred Over the Bus. RLAST Value in the Field is Valid Based on CV[N-1:0] (680) |

FIG. 6

SYSTEM, METHOD AND APPARATUS FOR ENABLING PARTIAL DATA TRANSFERS WITH INDICATORS

BACKGROUND

Some protocols do not provide for transferring partial data from one data bus to a second data bus, which has increased capacity. This deficiency may result in systems with mismatched data bus sizes, which require additional merge-buffers at all points of interconnect as well as where data bus size mismatches are encountered. These additional merge-buffers result in undesired increases in area and/or increases in power requirements for the system.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms mean that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The following terms may be used in this description of various embodiments of the present disclosure.

Auxiliary: additional, supplemental.

AXI: Advanced e(X)tensible Interface (AXI). AXI is an interface developed by ARM®.

AXID: Advanced e(X)tensible Interface (AXI) Identification. AXI is an interface developed by ARM® for the ARM® AMBA microcontroller bus and is currently used by many companies such as Xilinx® incorporated.

Beat: an individual data transfer within an AXI burst.

Block Offset: specifies the desired data within the stored block data within the cache row. Sometimes referred to merely as "offset".

Buffer: a temporary storage area, usually in RAM. The purpose of most buffers is to act as a holding area, enabling the CPU to manipulate data before transferring it to a device.

Bus: a communication mechanism that transfers data between components inside a computer, or modules of a computer, or between computers. As used herein the term "bus" covers all related hardware components (wire, optical fiber, etc.) and software, including communication protocols.

Cache: cache memory, also called CPU memory, is random access memory (RAM) that a computer microprocessor can access more quickly than it can access regular RAM. This memory is typically integrated directly with the CPU chip or placed on a separate chip that has a separate bus interconnect with the CPU.

Cache Block: basic unit for cache storage. May contain multiple bytes/words of data. A cache line is the same as cache block. Note that this is not the same as a "row" of cache.

CPU: central processing unit; the electronic circuitry within a computer that carries out the instructions of a computer program by performing the basic arithmetic, logical, control and input/output (I/O) operations specified by the instructions.

Execution: the basic operational process of a computer. It is the process by which a computer retrieves a program instruction from its memory, determines what actions the instruction dictates, and carries out those actions. This cycle is repeated continuously by the central processing unit (CPU), from boot-up to when the computer is shut down.

Flowchart: a type of diagram that represents an algorithm, workflow or process. The flowchart shows the steps as boxes of various kinds, and their order.

Generate: to produce, create or derive from one or more steps or actions.

Index: describes which cache set that data has been put in.

Interface: either a hardware connection or a user interface. An interface can also be used as a verb, describing how two devices connect to each other. A hardware interface is used to connect two or more electronic devices together.

Micro-architectural: computer organization, the way a given instruction set architecture (ISA), is implemented in a processor.

Interface Bridge: joins two or more interfaces to a layer. The layers are joined by the interface bridge as though the layers were joined to the same switch.

I/O: input/output, the transfer of data between a processor and a peripheral device in a data processing system. I/O devices may include keyboards, displays, pointing devices, etc. that can be coupled either directly or through intervening I/O controllers.

Merge: to combine data portions.

Merge Buffer: a type of buffer that stores data that will be merged, or has been merged.

Module: a component or part of a program or device that can contain hardware or software, or a combination of hardware and software. In a module that includes software, the software may contain one or more routines, or subroutines. One or more modules can make up a program and/or device.

Offset: the block offset is sometimes simply referred to as the "offset" or the "displacement".

Operation: a single step performed by a computer in the execution of a program.

Ordering tag: kind of metadata that helps describe an item and allows it to be found again by browsing or searching.

Peripheral: a computer device, such as a keyboard or printer, which is not part of the essential computer (i.e., the memory and microprocessor). These auxiliary devices are typically intended to be connected to the computer.

Protocol bridge: a device that connects two networks, such as local-area networks (LANs), or two segments of the same LAN that use the same protocol, such as Ethernet or Token-Ring.

Register: a temporary storage area.

Source Code: any collection of code, possibly with comments, written using human readable programming language, usually as plain text. The source code of a program is specially designed to facilitate the work of computer programmers, who specify the actions to be performed by a computer mostly by writing source code. The source code is often transformed by an assembler or compiler, into binary machine code understood by the computer. The machine code might then be stored for later execution. Alternatively, source code may be interpreted and thus immediately executed.

Tag: a unique identifier for a group of data. Because different regions of memory may be mapped into a block, the tag is used to differentiate between them.

In an interface protocol, as an AXI protocol, there is usually no provision for transferring partial data from a first bus to a second bus, which is a wider data bus, also described as a bus with increased capacity. This results in interface based systems, such as AXI based systems, with mismatched data bus sizes, which means that the system uses additional merge-buffers at all points on the interconnect where such data bus size mismatches are encountered. This results in undesired additional area/power overhead for the system.

Embodiments described herein enable partial data transfers on a wider data bus thereby optimizing area/power metrics for the system.

A sufficiently complex AXI based system may be composed of a diverse set of blocks with different data bus sizes. These different data bus sizes create a need for merge-buffers at every point where data bus width mismatch is encountered. A merge-buffer is required when data is moving from a narrow data bus to a wider data bus and typically, data is not guaranteed to arrive back-to-back on the narrow data bus since the AXI protocol does not support partial datatransfers on a wider data bus.

Figure 1:
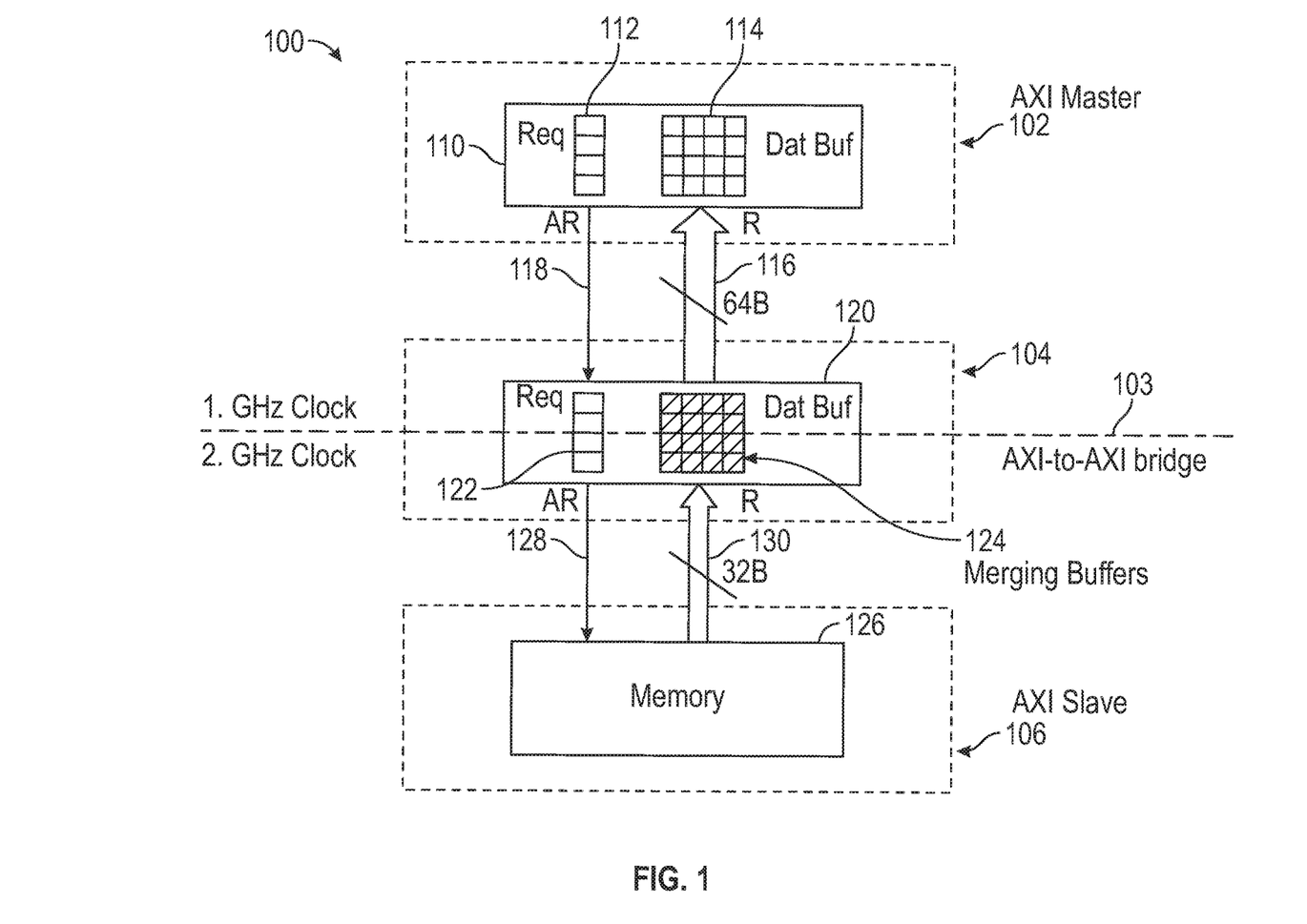
FIG. 1 illustrates an interface system.

FIG. 1 shows a system 100 that includes a first interface, shown as AXI master 102, an interface-to-interface bridge, shown as AXI-to-AXI bridge, 104 and a second interface, shown as AXI slave 106.

The first interface, shown as AXI master, 102 has memory module 110. The memory module 110 includes one or more registers 112 and one or more data buffers 114. The register(s) 112 is used as a temporary storage area, or memory area, built into memory module 110. The register(s) 112 may be used to fetch instructions and hold each instruction as it is executed. The register(s) 112 may be used to pass data from a memory to a processor.

The data buffer 114 is used to buffer data at AXI master 102. The data in data buffer 114 is received via bus 116.

The interface-to-interface bridge, shown as AXI-to-AXI bridge, 104 includes memory, or storage module 120. Storage module 120 includes one or more registers 122 and one or more merging buffers 124.

Second interface, shown as AXI slave, 106 includes storage, or memory module 126.

The second interface, AXI slave, 106 has a 2 GHz clock and first interface, AXI master, 102 has a 1 GHz clock. The distinction between the two clocks is indicated by dashed line 103. Register 112 is in communication with register 122 via bus 118. Register 122 is in communication with memory module 126 via 128.

First interface, AXI Master, 102 has a 64B data bus 116 and second interface, AXI slave, 106 has a 32B data bus 130. The AXI-to-AXI bridge 104 manages data bus width mismatch and has a tracker to process transactions. As shown in FIG. 1, the bus width and clock speeds are proportional. Thus, AXI master 102 has a 64B data bus 116 and a 1 GHz clock, while AXI slave 106 has a 32B data bus 130 and a 2 GHz clock.

FIG. 1 shows that the AXI-to-AXI bridge 104 utilizes full read buffering to merge two 32B beats (130) into one 64B beat (116) since two 32B beats are not guaranteed to arrive back-to-back. This may result in significant overhead in terms of area if AXI master 102 has many outstanding Read transactions.

Figure 2:
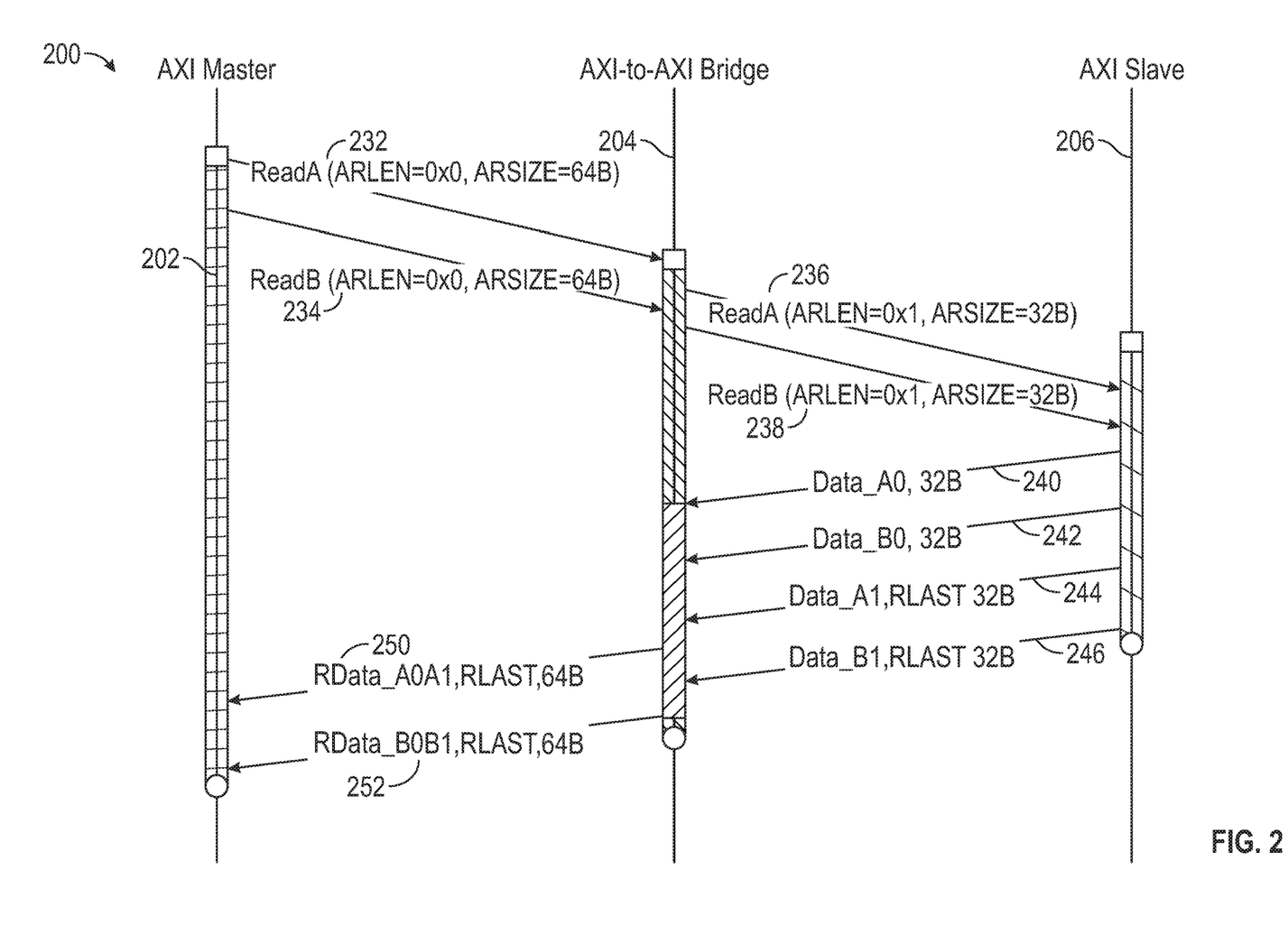
FIG. 2 illustrates a merge-buffer embodiment.

FIG. 2 shows system 200 that includes first interface, AXI master 202, interface-to-interface bridge 240, AXI-to-AXI bridge, 204 and second interface, AXI slave 206. ReadA (ARLEN=0x0, ARSIZE=64B) 232, and ReadB (ARLEN=0x0, ARSIZE=64B) 234 are shown. AXI-to-AXI bridge 204 sends ReadA(ARLEN=0x1, ARSIZE=32B) 236 and ReadB(ARLEN=0x1, ARSIZE=32B) 238.

Data_A0,32B, 240; Data_B0,32B, 242; Data_A1, RLAST, 32B, 244; Data_B1,RLAST,32B, 246; RData_A0A1,RLAST,64B, 250; and RData_B0B1,RLAST, 64B, 252 are shown. A merge-buffer covers a window from when first data arrives 240 until the last data is delivered 252.

FIG. 2 shows that there are two pending read requests on narrow data bus side, for example a 32B data bus. It may happen that first chunk(half) for two reads arrive before second chunk may arrive. AXI-to-AXI bridge 204 needs to save the first chunk of read since the wider data bus side (64B) can only accept data when both the chunks are available. This necessitates the use of the merge-buffer.

For example: If AXI Master 232 supports 256 outstanding read request each worth one cacheline size, the size of the merge buffer required in this case is 64B×256=128K flops, which is a significant overhead in terms of PPA.

Embodiments described herein comprise an AXI Slave 206 tagging each read data beat with chunk valid identifier called a "CV".

There are parameters for the CV (chunk valid) generation:

Each bit of the CV indicates the portion of the data bus which carries valid data.

The portion-size of the wider data bus, which is denoted by each bit of CV, is same as narrowest data bus size in the system.

The width of the CV on a particular bus is determined by a ratio of the narrowest data bus size to its own bus size in the system.
  a. For example: In systems with 64B and 32B data bus widths, CV will be 2-bit value for 64B bus.
  b. For example: In systems with 64B, 32B, and 16B data bus widths, CV will be 4-bit value for 64B bus while CV will be 2-bit value for 32B bus.

Value of 0 is not permitted on CV.

Staggered values on CV is allowed.

For example: In systems with 64B and 16B data bus widths, a CV value of 0101 is allowed.

It is shown that RLAST semantics do not change with the particular embodiment, which means RLAST always arrives on the last data beat even though last data beat may not contain valid data on the entire bus. This ensures that all existing IP's which are watching RLAST to detect protocol completion windows still comport with the process.

Figure 3:
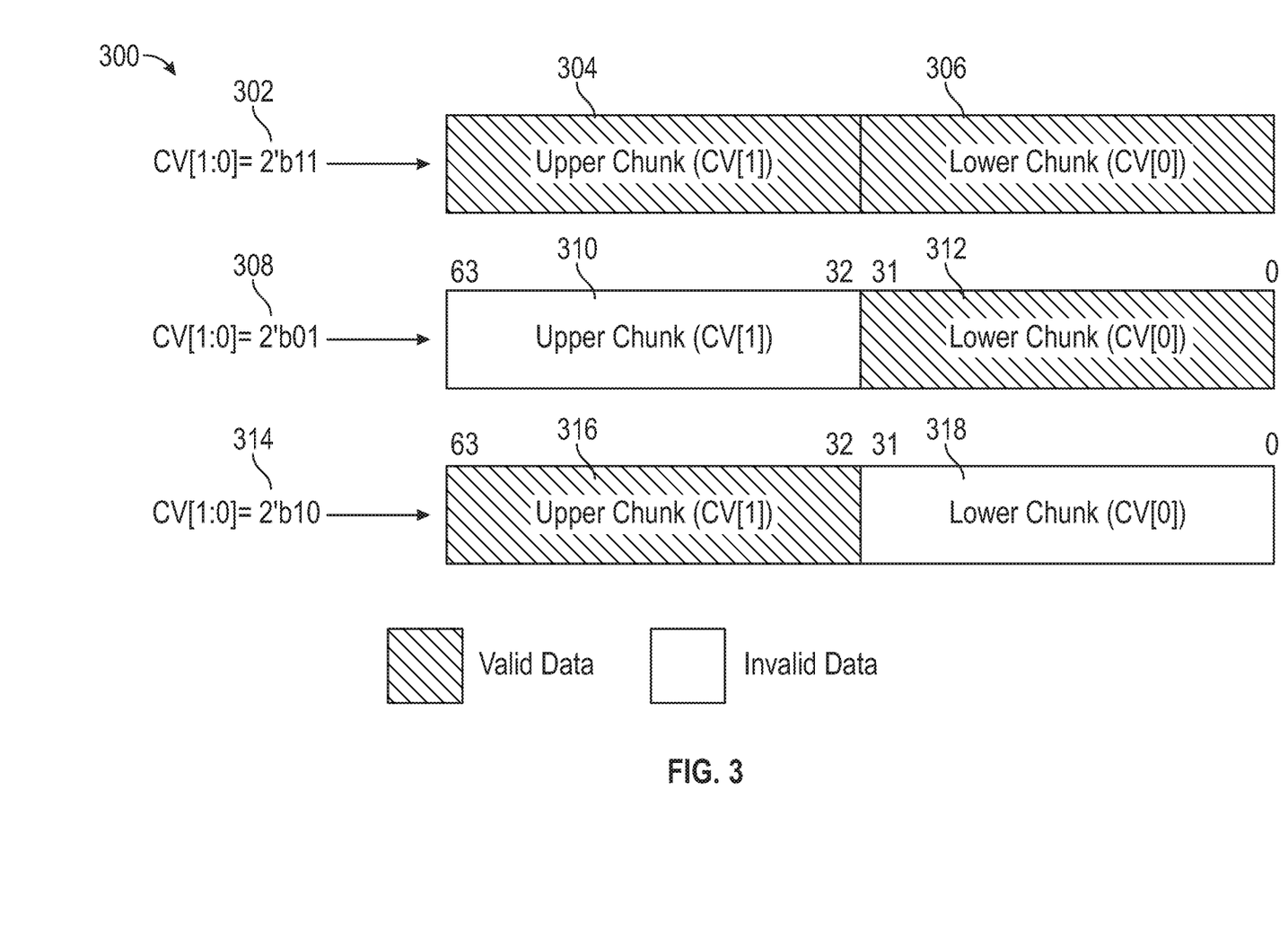
FIG. 3 illustrates an embodiment described herein.

As shown in FIG. 3, system 300 has 64B and 32B bus widths, CV on 64B bus is 2-bit wide and each bit indicate the half which is valid.

Specifically, as shown in FIG. 3, CV[1:0]=2'b11, 302 has valid lower chunk (CV[0]) 306 and valid upper chunk (CV[1]) 304. Secondly, CV[1:0]=2'b01, 308 has valid lower chunk (CV[0]) 312 and invalid upper chunk (CV[1]) 310. Thirdly, CV[1:0]=2'b10, 314 has invalid lower chunk (CV [0]) 318 and valid upper chunk (CV[1]) 316.

In case shown in FIG. 3, legal values of CV [1:0] (302, 308, 314)=
{2'b11,2'b10,2'b01}

Figure 4:
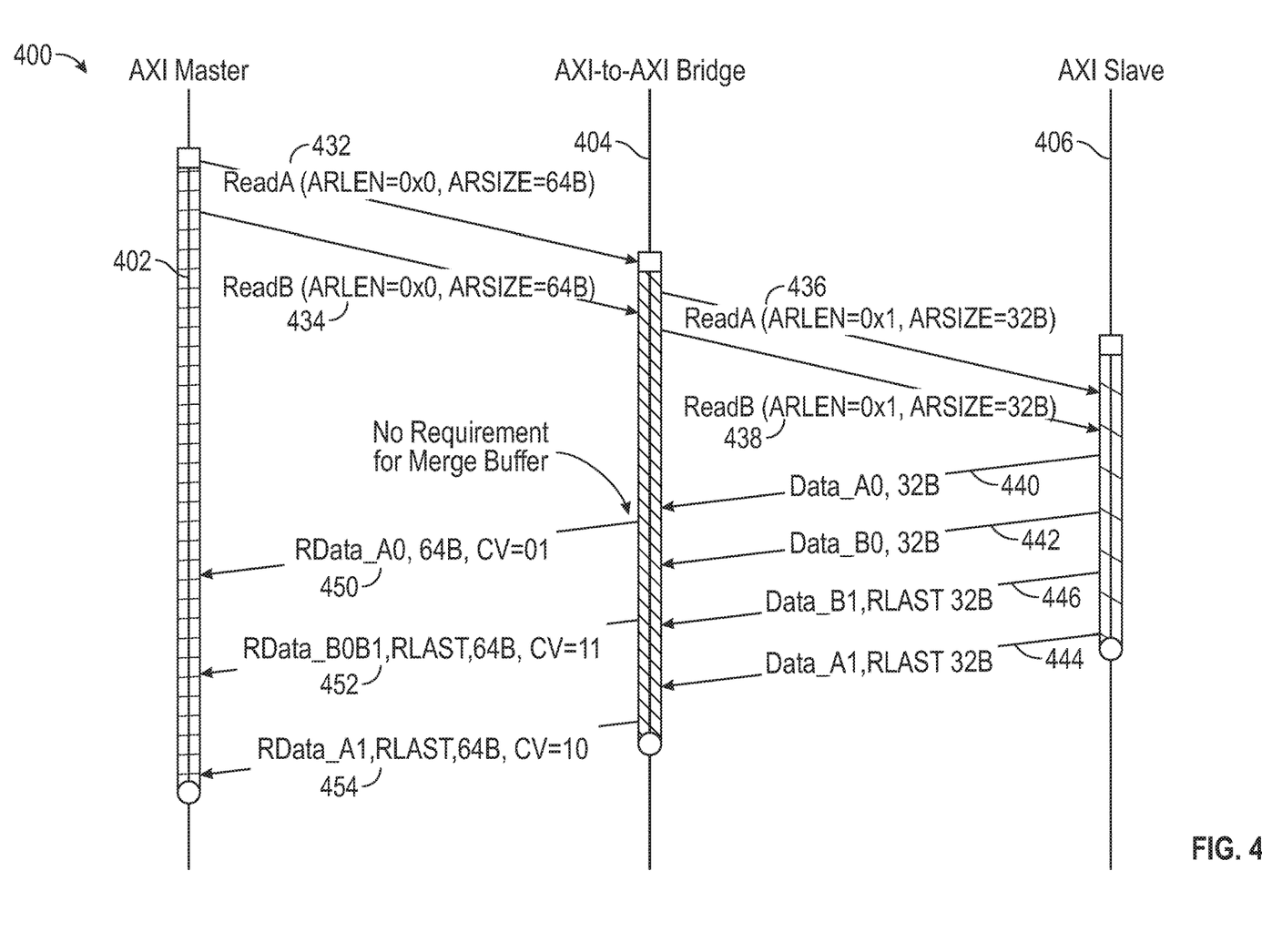
FIG. 4 illustrates yet another embodiment described herein.

FIG. 4 shows a chunk valid example 400 according to an embodiment described herein. FIG. 4 shows system 400 that includes first interface, AXI master 402, interface-to-interface bridge, AXI-to-AXI bridge, 404 and second interface, AXI slave, 406. ReadA (ARLEN=0x0, ARSIZE=64B) 432, and ReadB (ARLEN=0x0, ARSIZE=64B) 434 are sent from AXI master 402. AXI-to-AXI bridge 404 sends ReadA (ARLEN=0x1, ARSIZE=32B) 436 and ReadB (ARLEN=0x1, ARSIZE=32B) 438.

Data_A0,32B, 440; Data_B0,32B, 442; Data_B1,RLAST, 32B, 446; Data_A1,RLAST,32B, 444; are sent from AXI slave 406. Bits RData_A0,64B, CV=01, 450; RData_B0B1, RLAST,64B, CV=11, 452; and RData_A1, RLAST,64B, CV=10,454 are shown.

FIG. 4 is different than FIG. 2 because the data bits 440, 442, 444 and 446 are in a different sequence, that is A0 (440) and A1 (444) are not in direct sequence; but rather, B0 (442) and B1 (446) are between A0 (440) and A1 (444). Additionally, there is no merge buffer, as shown in FIG. 2. Also, the bits 450, 452 and 454 have an associated CV identifier. The data 440, 442, 444 and 446 are in a random order.

As shown in FIG. 4, AXI-to-AXI bridge 404 is sending partial data RDATA_A0 (440) on wider data bus using chunk valid indication of CV=01 (450). When Data_B0 (442) and Data_B1(446) from narrow side arrives back to back, it can be collapsed into single wider data bus response and sent as RData_B0B1 with CV=11 (452). Finally, when the second beat of ReadA (444) arrives, it is sent with CV=10 and with RLAST indication (454).

AXI master 402 needs to understand the meaning of the associated CV value so that AXI master 402 can accept correct portion of the data.

Embodiments also include one or more flags from AXI master 402, which can tell AXI slave 406 whether AXI master 402 can tolerate partial data transfers. The flag may be identified, or called, "ChunkValidEnable". Legacy AXI masters may choose to drive ChunkValidEnable=0.

If AXI slave 406 is not capable of driving different chunk valid values, it is an embodiment that the flag may be set as all 1's.

If AXI master 402 sets ChunkValidEnable=0, AXI slave 406 sets CV=all 1's.

Figure 5:
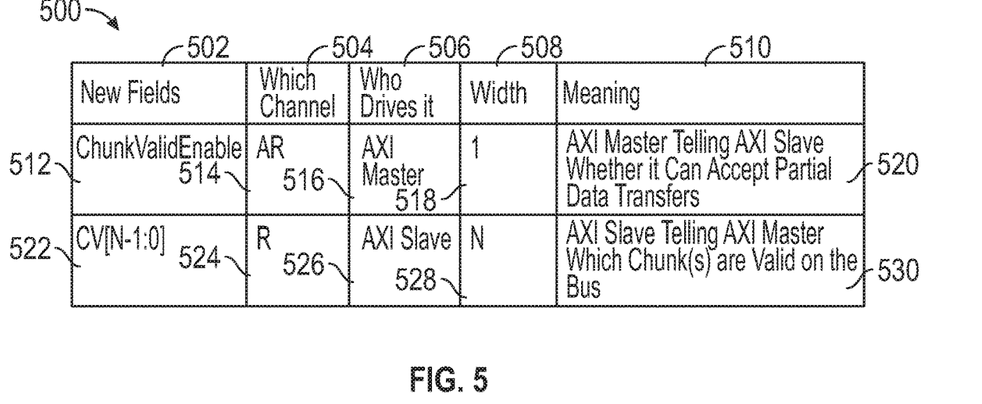
FIG. 5 illustrates a table according to a representative embodiment.

FIG. 5 shows a representation 500 that includes "new fields" 502, "channel" 504, "drive" 506, "width" 508 and "meaning" 510. In the field 502 is "chunk valid enable" 512 and CV[N-1:0] 522. Channel 504 includes AR 514 and R 524. Drive 506 includes AXI master 516 and AXI slave 526. Width 508 includes "1" 518 and "N" 528. Meaning 510 includes a description of what the driver is instructing 520, 530, respectively.

If the AXI systems do not have flexibility to add new fields, ARUSER/RUSER fields can be used to populate new fields.

Figure 6:
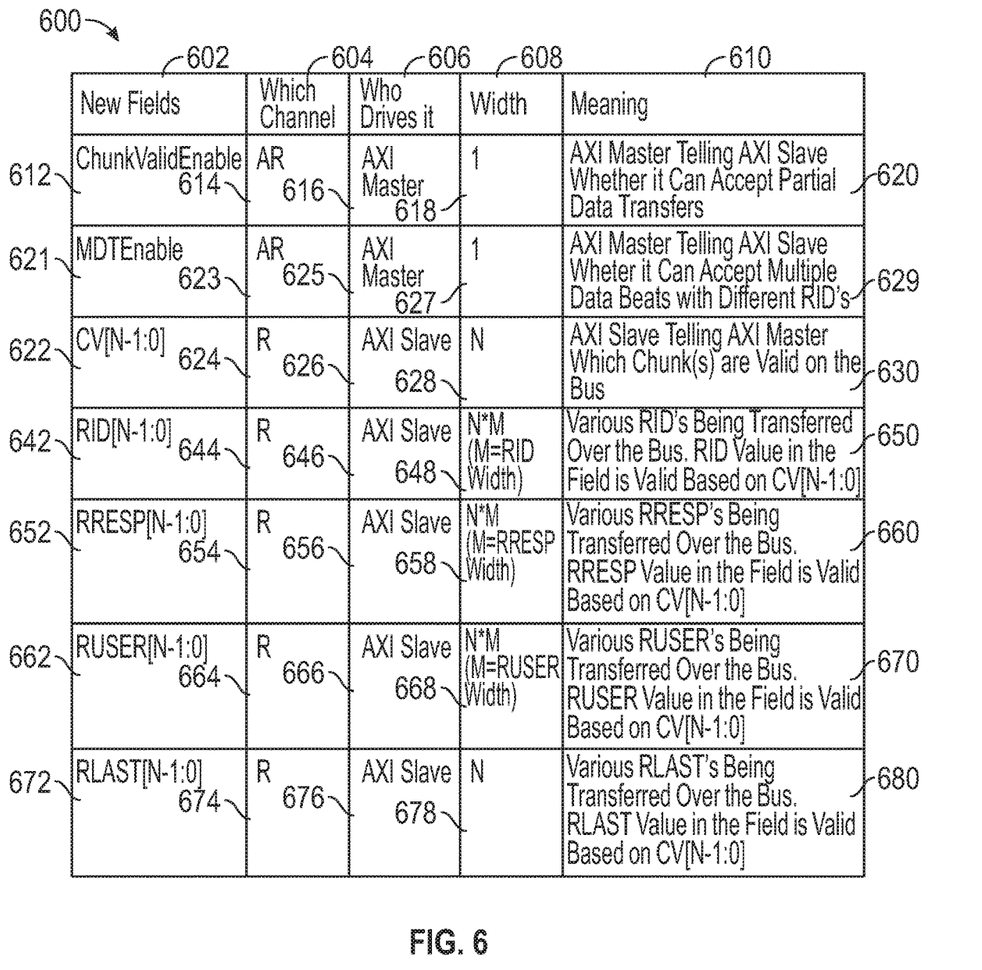
FIG. 6 illustrates another table according to another representative embodiment.

The embodiment shown in FIG. 5 can be augmented by driving two or more (up-to N, where "N" is any suitable number) distinct 32B data beats on a single 64B read data bus, which is shown in FIG. 6.

The embodiment of FIG. 6 shows that AXI slave flag has a special message "multi-data transfer enabled". In this mode, every distinct chunk being transferred is associated with its own set of R channel fields such as:
  RID[N-1:0] (642);
  RRESP[N-1:0] (652);
  RUSER[N-1:0] (662); and
  RLAST[N-1:0] (672).

AXI Master can control if it is capable of accepting multiple narrow data beats with distinct RID's on a wider data bus using a field "MDTEnable" (Multi-Data-Transfer Enable) (622). Note that there may be "N" unique RID's and RLAST's which can arrive on a single RDATA bus and Master should be capable of uniquely identifying it and handling it.

This will enable Chunk merging buffers to be eliminated while meeting high bandwidth needs without wasting any data bus efficiency.

FIG. 6 shows a representation 600 that includes "new fields" 602, "channel" 604, "drive" 606, "width" 608 and "meaning" 610.

In the field 602 is "chunk valid enable" 612; MDTEnable 621; CV[N-1:0]622; RID[N-1:0] 642; RRESP[N-1:0] 652; RUSER[N-1:0] 662; and RLAST[N-1:0]672;

Channel 604 includes AR 614; AR 623; R 624; R 644; R 654; R 664; and R 674.

Drive 606 includes AXI master 616; AXI master 625; AXI slave 626; AXI slave 646; AXI slave 656; AXI slave 666;

and AXI slave 676. Thus, there are intermediate AXI interface slaves that may choose to send partial data on a wider bus.

Width 608 includes "1" 618; "1" 627; "N" 628; "N*M (M=RID width)" 648; "N*M (M=RRESP width" 658; "N*M (M=RUSER width" 668; and "N" 678.

Meaning 610 includes a description of instructions, as shown by 620, 629, 630, 650, 660, 670 and 680, respectively.

If AXI master sets MDTEnable=0, AXI slave sets the same values on RID 642, RRESP 652, RUSER 662, RLAST 672 for all narrow beats within a wider beat.

If the AXI systems do not have flexibility to add new fields, ARUSER/RUSER fields can be used to populate new fields.

By removing the need for merging all data beats from a narrow bus side, the need for merge buffers at all intermediate points on the interconnect is eliminated and hence the system becomes optimized from area/power perspective.

Intermediate agents/AXI Slave can choose to send partial data on wider data bus if system wants to optimize latency for critical portion of data. This improves the performance of overall system.

Interconnects with no merge buffers need to fully serialize requests so that all narrow beats can come back to back which can be merged to form a wider data beat. With the embodiments shown in the present disclosure, such interconnects with no merge buffer does not need to serialize requests and all requests can be sent in parallel thereby improving the performance of the system.

One or more of the embodiments may be performed on a computing device. A computing device may be understood to be any device having a processor, memory unit, input, and output. This may include, but is not intended to be limited to, cellular phones, smart phones, tablet computers, laptop computers, desktop computers, personal digital assistants, graphical processing units, field programmable gate arrays, etc. Components of the computer may include, but are not limited to, a processing unit, a system memory, and a system bus that couples various system components including the system memory to the processing unit.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory includes computer storage media in the form of volatile and/or nonvolatile memory such as read only memory (ROM) and random-access memory (RAM). A basic input/output system (BIOS), containing the basic routines that help to transfer information between elements within computer, such as during start-up, is typically stored in ROM.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present embodiments are described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer, or other programmable apparatus to produce a computer-implemented process such that the instructions which execute on the computer or other programmable apparatus, provide processes for implementing the functions/acts specified in the flowchart and/or block diagram block or blocks.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the disclosure may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

The apparatus, system and methodologies presented herein provide an advancement in the state of the art.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

It can be seen that the system and methodologies presented herein provide an advancement in the state of the art.

Accordingly, some of the disclosed embodiments are set out in the following items.

1. A method comprising: generating one or more identifiers, each identifier having a plurality of bits and a width component; and tagging one or more data beats with an associated identifier selected from the one or more identifiers; where each bit of the identifier indicates a portion of a data bus which carries valid data; where the width of the identifier on a particular data bus is determined by a ratio of a narrowest data bus size to a bus size of the identifier; and enabling partial data transfers of the data beats based on the identifier.

2. The method in item 1, where a portion parameter of a second data bus is the same as the narrowest data bus size.

3. The method in item 1, where the identifier has a staggered value.

4. The method in item 1, further comprising: designating a completion code associated with the identifier that signifies a last data beat.

5. The method in item 1, further comprising: utilizing a flag to determine whether partial data transfers are permissible.

6. The method in item 1, further comprising: driving a plurality of data beats on a single read data bus, where the single read data bus is wider than the data beats.

7. The method in item 6, where the single read data bus is 64B.

8. The method in item 1, further comprising: interleaving one or more unrelated data beats on a single read data bus in a non-sequential order.

9. The method in item 1, where portions of the identifier represent valid data and/or invalid data.

10. An apparatus comprising: a first bus having a first width; a second bus having a second width, the second width being greater than the first width; and an interface configured to send partial data on the second bus using an identifier that indicates the partial data is valid, where the identifier has a plurality of bits and a width component, where each bit of the identifier indicates a portion of the first data bus that carries valid data, and where the width of the identifier on the first data bus is determined by a ratio of a narrowest data bus size to the width of the first data bus.

11. The apparatus in item 10, further comprising: an interface slave associated with the first data bus; and an interface master associated with the second data bus.

12. The apparatus in item 11, where the interface master indicates to the interface slave whether the interface master can accept partial data transfers.

13. The apparatus in item 11, further comprising: one or more intermediate interface slaves configured to send partial data.

14. The apparatus in item 11, where the interface slave drives a plurality of data beats on the second data bus.

15. The apparatus in item 10, further comprising: an interleaving buffer configured to store interleaved single data beats.

16. The apparatus in item 10, where the identifier has a staggered value.

17. The apparatus in item 10, where a portion parameter of the second data bus is the same as the narrowest data bus size.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method comprising:
generating one or more identifiers, each of the one or more identifiers having a plurality of bits and a width component; and
tagging one or more data beats with an associated identifier selected from the one or more identifiers;
where each bit of the associated identifier indicates a portion of a data bus which carries valid data;
where the width of the associated identifier on a particular data bus is determined by a ratio of a narrowest data bus size to a bus size of the associated identifier; and
enabling partial data transfers of the data beats based on the associated identifier.

2. The method as claimed in claim 1, where a portion parameter of a second data bus is the same as the narrowest data bus size.

3. The method as claimed in claim 1, where the identifier has a staggered value.

4. The method as claimed in claim 1, further comprising:
designating a completion code associated with the identifier that signifies a last data beat.

5. The method as claimed in claim 1, further comprising: utilizing a flag to determine whether partial data transfers are permissible.

6. The method as claimed in claim 1, further comprising: driving a plurality of data beats on a single read data bus, where the single read data bus is wider than the data beats.

7. The method as claimed in claim 6, where the single read data bus is 64B.

8. The method as claimed in claim 1, further comprising: interleaving one or more unrelated data beats on a single read data bus in a non-sequential order.

9. The method as claimed in claim 1, where portions of the identifier represent valid data and/or invalid data.

10. An apparatus comprising:
a first bus having a first width;
a second bus having a second width, the second width being greater than the first width; and
an interface configured to send partial data on the second bus using an identifier that indicates the partial data is valid,
where the identifier has a plurality of bits and a width component,
where each bit of the identifier indicates a portion of the first data bus that carries valid data, and
where the width of the identifier on the first data bus is determined by a ratio of a narrowest data bus size to the width of the first data bus.

11. The apparatus as claimed in claim 10, further comprising:
an interface slave associated with the first data bus; and
an interface master associated with the second data bus.

12. The apparatus as claimed in claim 11, where the interface master indicates to the interface slave whether the interface master can accept partial data transfers.

13. The apparatus as claimed in claim 11, further comprising:
one or more intermediate interface slaves configured to send partial data.

14. The apparatus as claimed in claim 11, where the interface slave drives a plurality of data beats on the second data bus.

15. The apparatus as claimed in claim 10, further comprising:
an interleaving buffer configured to store interleaved single data beats.

16. The apparatus as claimed in claim 10, where the identifier has a staggered value.

17. The apparatus as claimed in claim 10, where a portion parameter of the second data bus is the same as the narrowest data bus size.

* * * * *